(12) United States Patent
Diehl

(10) Patent No.: US 9,015,115 B2
(45) Date of Patent: Apr. 21, 2015

(54) PROJECT MANAGEMENT SYSTEM WITH ASYNCHRONOUS UPDATING

(71) Applicant: Oracle International Corporation, Redwood Shores, CA (US)

(72) Inventor: Brian Diehl, Mooresville, NC (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/622,540

(22) Filed: Sep. 19, 2012

(65) Prior Publication Data

US 2013/0290250 A1    Oct. 31, 2013

Related U.S. Application Data

(60) Provisional application No. 61/640,202, filed on Apr. 30, 2012.

(51) Int. Cl.
*G06F 7/00* (2006.01)
*G06Q 10/06* (2012.01)

(52) U.S. Cl.
CPC . *G06F 7/00* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 2005/0198085 A1* | 9/2005 | Blakey et al. | 707/204 |
| 2006/0037014 A1* | 2/2006 | Ersek et al. | 717/168 |
| 2006/0070019 A1* | 3/2006 | Vishnumurty et al. | 717/101 |
| 2007/0043788 A1* | 2/2007 | Cannon et al. | 707/203 |
| 2008/0147470 A1* | 6/2008 | Johri et al. | 705/9 |
| 2009/0196412 A1* | 8/2009 | Finch et al. | 379/265.03 |
| 2012/0173294 A1* | 7/2012 | Olson et al. | 705/7.11 |
| 2013/0246119 A1* | 9/2013 | Slaughenhoupt | 705/7.27 |

* cited by examiner

*Primary Examiner* — Tony Mahmoudi
*Assistant Examiner* — Umar Mian
(74) *Attorney, Agent, or Firm* — Miles & Stockbridge P.C.

(57) ABSTRACT

A system for defining a plurality of extended tables, wherein each extended table of the plurality of extended tables is associated with a corresponding base table of a plurality of base tables. The system updates data contained by the plurality of extended tables in accordance with data contained by the plurality of base tables, wherein the updating is performed asynchronously across logical units of data contained by the plurality of extended tables. The system provides a combined view of the data contained by the plurality of extended tables and the data contained by the plurality of base tables.

15 Claims, 8 Drawing Sheets

PROJECT MANAGEMENT SYSTEM WITH ASYNCHRONOUS UPDATING

CROSS REFERENCE TO RELATED APPLICATIONS

This application claims priority of Provisional Application Ser. No. 61/640,202 filed on Apr. 30, 2012, the contents of which are hereby incorporated by reference.

FIELD

One embodiment is directed generally to a computer system, and in particular to a computer system that performs project management reporting.

BACKGROUND INFORMATION

A project is an endeavor that may involve a set of tasks that are planned to achieve a particular result. Project management is the discipline of planning, organizing, and coordinating resources to achieve specific goals to bring about the particular result. A project may include a starting date and a completion date that depend upon the complexity and time requirements of the tasks to be completed. Each project task may also have deadlines that are determined and modified based upon the progress of other project tasks. A project may be determined to be finished when the associated tasks are finished.

Project management systems are computer systems that aid users in initiating, planning, executing, and monitoring various aspects of a large project. For example, a project management system may be used to schedule the events of a project. A project management system may help the user to overcome some common challenges in scheduling such as: (1) scheduling events that depend upon the outcome of other circumstances, (2) scheduling events that have an inexact duration, and (3) scheduling events in conjunction with the scheduling of necessary resources.

A project management system may also be used to provide relevant information to stakeholders of a large project. Such information may include: (1) estimates on the time required to finish various tasks of the project, (2) warnings about possible circumstances adverse to the completion of the project, (3) description of the workload at various stages of the project, (4) ways to optimize the resources of the project, and (5) the costs associated with the project.

SUMMARY

One embodiment is a system for performing asynchronous updating for project management reporting. The system defines a plurality of extended tables, wherein each extended table of the plurality of extended tables is associated with a corresponding base table of a plurality of base tables. The system updates data contained by the plurality of extended tables in accordance with data contained by the plurality of base tables, wherein the updating is performed asynchronously across logical units of data contained by the plurality of extended tables. The system provides a combined view of the data contained by the plurality of extended tables and the data contained by the plurality of base tables.

DETAILED DESCRIPTION

Figure 1:
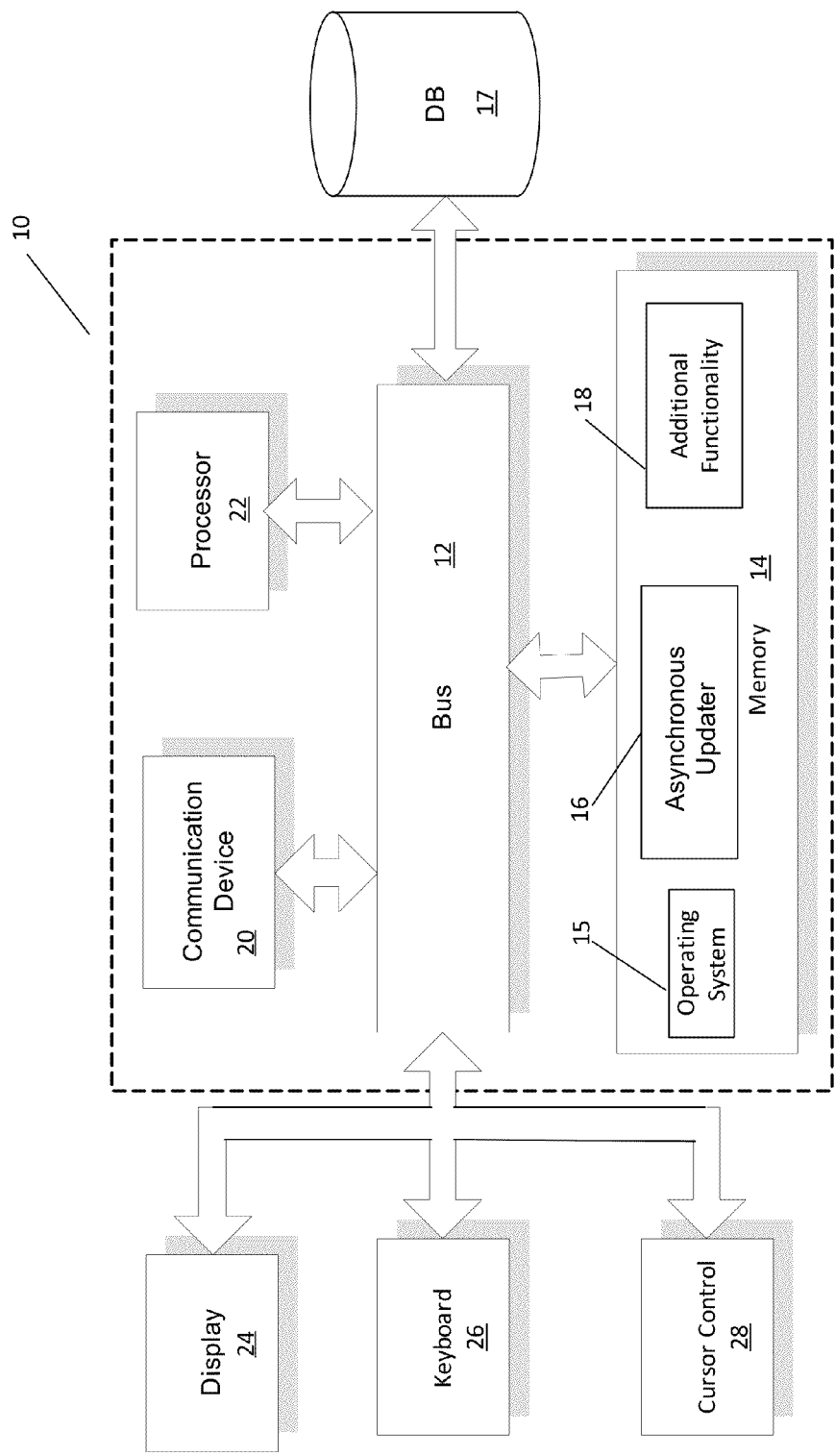
FIG. 1 is a block diagram of a computer server/system in accordance with an embodiment of the present invention

One embodiment is a project management system that provides a user with near or substantially real-time reporting of project management data. The system may define extended tables associated with corresponding base tables. The system may also perform asynchronous updating for project management reporting on data contained by the extended tables. The system may also provide users with a composite view of the data contained by the extended tables and of the data contained by the base tables.

Stored project management ("PM") data often contains a subset of data that is frequently updated. These updates result in a cascade of changes to logical elements of the PM data. Previously, application code would dynamically apply business rules to the underlying data fields to perform calculations associated with the updates. The data would then be displayed to the user.

Business rules in project management systems enable dynamic decisions at runtime that allow a user to automate policies, computations, and reasoning while separating rule logic from underlying application code. Using business rules in this manner allows more agile rule maintenance and empowers business analysts with the ability to modify rule logic without programmer assistance and without interrupting business processes. Business rules are statements that may describe business policies or describe key business decisions. For example, business rules may include, but are not limited to, business policies such as spending policies and approval matrices, constraints such as valid configurations or regulatory requirements, computations such as discounts or premiums, and reasoning capabilities such as offers based on customer value.

However, as a consequence of updating project management data using business rules, many key values related to the project management data are not persisted/preserved as part of the physical database schema of the underlying data fields. As a result, any functionality requiring direct interaction with the underlying data fields could not be accomplished without the application of business rules by the application code.

Because functionality requiring direct interaction with the underlying data fields could not be accomplished without the application of business rules by the application code, the following processes were difficult, if not impossible, to complete: (1) Structured Query Language-based ("SQL") reporting through traditional report writing tools, (2) data extraction for Extract Transform Load ("ETL") for data warehousing, and (3) long-term archiving/storage of data without also archiving the code base. Invocation of application logic at a future date was difficult, if not impossible, to execute.

Known project management systems typically perform necessary calculations for updating data during a Transformation step of an ETL process. Known project management systems use an Operational Data Store ("ODS") that was created post-calculation to provide a fully populated data set. However, these known project management systems have the disadvantage of providing operational reporting that is out-of-date with the underlying data fields.

For example, in known project management systems, the timing for performing calculations for updating data requires the user to wait for daily or weekly ETL processes to produce operational reporting. In many business environments, producing reports with these waiting periods is simply not practical.

Further, because processing is often tied to a single, monolithic ETL process, all processing is contained within the scope of the ETL. While this type of processing may be efficient when only processing rows for a single time, this type of processing does not efficiently use resources that are available outside of the timing of the ETL. As such, in known project management systems, hardware resources may sit idle during normal working hours.

In view of the above, certain embodiments define a plurality of extended tables corresponding to a plurality of base tables, wherein asynchronous updating is performed on the data contained by the plurality of extended tables. In contrast with the known approaches, one difference between certain embodiments when compared to the known project management systems is that the user is able to have near or substantially real-time reporting and usage of a full set of data elements, without affecting the existing application code, and without affecting the usage and data storage of underlying data fields.

FIG. 1 is a block diagram of a computer server/system in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 10.

In one embodiment, memory 14 stores software modules that provide functionality when executed by processor 22. The modules include an operating system 15 that provides operating system functionality for system 10. The modules further include an asynchronous updater module 16 for a project management system that allows a user to perform asynchronous updating for project management reporting, as disclosed in more detail below. System 10 can be part of a larger system such as a project management system (e.g., "Primavera" from Oracle Corp.) or an enterprise resource planning ("ERP") system (e.g., "E-Business Suite" from Oracle Corp.) Therefore, system 10 will typically include one or more additional functional modules 18 to include the additional functionality. A database 17 is coupled to bus 12 to store data used with modules 16 and 18. For example, database 17 may store project management data upon which asynchronous updating for project management reporting can be performed.

As discussed above, certain embodiments allow for near or substantially real-time reporting and usage of a full set of data elements, without substantially affecting the existing application code, and without substantially affecting the usage and data storage of underlying data fields. Such a system may: (1) define extended tables, (2) perform asynchronous updating, and (3) provide combined views to the user, for example.

Figure 2:
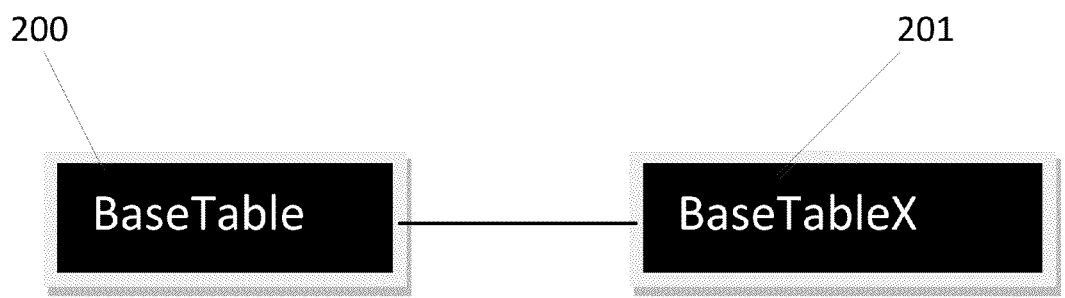
FIG. 2 is a block diagram illustrating the use of extended tables with base tables in a project management system in accordance with one embodiment.

FIG. 2 is a block diagram illustrating the use of extended tables with base tables in a project management system in accordance with one embodiment. Base table 200 may hold the core elements of the system. These elements represent the user-changeable elements of the data. They may be changed frequently by the user and may be the only elements under the direct control of the user.

In one embodiment, base table 200 is seamlessly extended by the addition of a parallel, extended table 201 containing additional, calculated attributes/data derived from the core elements of base table 200. For example, a user may store data corresponding to a start date and an end date for a task within base table 200. Extended table 201 may then store additional data derived from the start date and the end date data of base table 200. The additional data may include an amount of progress to be made each day between the start date and the end date, milestones to reach between the start date and the end date, for example. Extended table 201 is added to data in a database such as database 17 of FIG. 1. Both base table 200 and extended table 201 may share a same primary key. The extended table 201 may be dependent upon base table 200.

By extending the base tables 200 using extended tables 201 as described above, users may access the additional derived data from the extended tables 201 without needing to continually re-derive the additional derived data from base tables 200. As such, computing resources may be saved in a project management system.

One embodiment performs asynchronous updating. Specifically, an embodiment may use existing application code to apply updates to the extended table in response to user changes in the base table. As such, the extended table is updated frequently enough to display accurate reporting. Further, because performing single updates may cascade and affect multiple rows within the extended tables, certain embodiments do not endlessly respond to every change in the base table. Instead, rows of an extended table may be processed for updating in logical units. For example, a logical unit may be a project.

One embodiment may distinguish between two types of projects: (1) demand projects and (2) non-demand projects. The computer system may handle the processing of these two types of projects differently, with differing process flows.

Demand projects are projects that are actively updated. The amount of updating may vary greatly depending on whether the project is in a planning or an execution phase.

Non-demand projects are projects that are either complete or on hold. These projects may also be projects that are currently not updated by users. However, reporting on these projects may still be needed for historical record-keeping purposes.

Certain embodiments may consider non-demand projects to be relevant at an initial startup of a computer system. Once non-demand projects are handled once, they may require no further processing unless a data update occurs (i.e., upon which the non-demand project may then be considered a demand project). Although non-demand projects may eventually need to be processed, non-demand projects do not take precedence over demand projects. Instead, non-demand projects are processed gradually, when time permits.

In certain embodiments, with demand projects, a user may request processing by either: (1) changing a number of rows of data above a specified threshold or (2) directly requesting immediate processing of a project, regardless of the number of changes associated with the project.

Figure 3A:
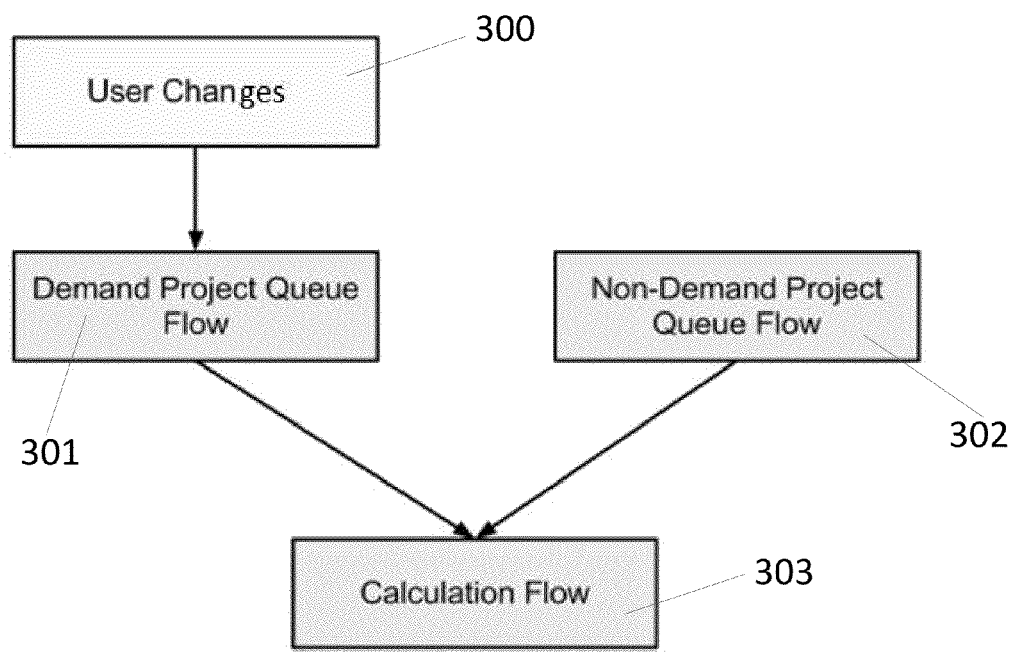
FIG. 3A is a flow diagram of the functionality of an asynchronous updater module of FIG. 1 when performing asynchronous updating in accordance with one embodiment.

FIG. 3A is a flow diagram of the functionality of the asynchronous updater module 16 of FIG. 1 when performing asynchronous updating in accordance with one embodiment. In one embodiment, the functionality of the flow diagram of FIG. 3A (and FIGS. 3B, 3C, and 3D below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

User changes 300 to a base table may prompt the start of Demand Project Queue Flow 301. Both Demand Project Queue Flow 301 and Non-Demand Project Queue Flow 302 may also be started by their own corresponding stored procedures that are scheduled to run in a database server. For example, a stored procedure may be scheduled to run once every minute. In one embodiment, a stored procedure may be an arbiter stored procedure that orchestrates, prioritizes, and schedules logical units to be processed based on user-maintained thresholds. User-maintained thresholds may include, but are not limited to, (1) a number of physical rows requiring updates within the logical unit or (2) an amount of time that has passed since the last update that resulted in at least one change, for example. As such, certain embodiments may respond quickly to high-traffic hot-spots in the data, but need not bother with updating areas that are not changing at all. Upon completion of Demand Project Queue Flow 301 and/or Non-Demand Project Queue Flow 302, Calculation Flow 303 updates data within extended tables, if necessary.

Figure 3B:
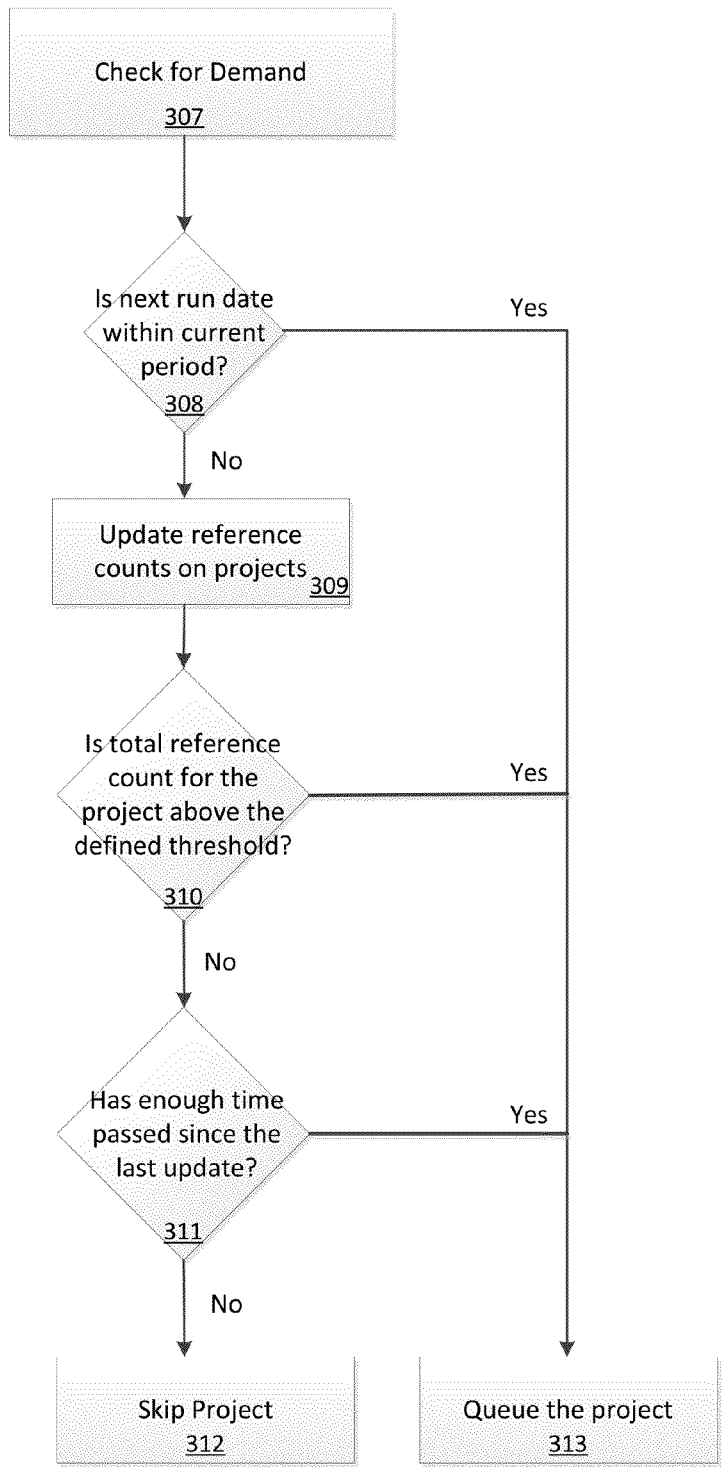
FIG. 3B is a flow diagram of the demand project queue flow of FIG. 3A in accordance with one embodiment.

FIG. 3B is a flow diagram of demand project queue flow 301 of FIG. 3A in accordance with one embodiment. At 307, a check is performed to determine whether any events have occurred that result in a demand project that needs to be processed. For example, if data associated with a project is recently updated, the project may then be considered to be a demand project. Given that a demand project exists for processing, the process continues to 308.

At 308, a determination is made regarding whether a run time for the processing of a demand project is scheduled to be performed during the current period. If processing of a demand project is scheduled to be performed during the current period, then a demand project may be queued at 313 for processing.

On the other hand, if the processing of a demand project is not scheduled to be performed during the current period, a reference count for the demand project is updated at 309. The reference count may correspond to a number of times that a project is referenced by associated changes in data of the base table, for example.

At 310, a determination is made regarding whether the total reference count for the project exceeds a defined threshold. If the total reference count of the project does exceed a defined threshold, then the project may be queued at 313 for processing. The reference count associated with that queued project may then be reset to zero. The defined threshold may be 100 row changes, for example.

On the other hand, if the total reference count for the project does not exceed a defined threshold, then a determination is made regarding whether a measured amount of time exceeds a threshold amount of time at 311. The measured amount of time may correspond to an amount of time since the last update in which at least one row was changed in the project. If enough time has passed since the last update, then the project may be queued at 313 for processing. The threshold amount of time may be eight hours, for example.

On the other hand, if not enough time has passed since the last update, the project is skipped over at 312 and is not queued for processing.

Figure 3C:
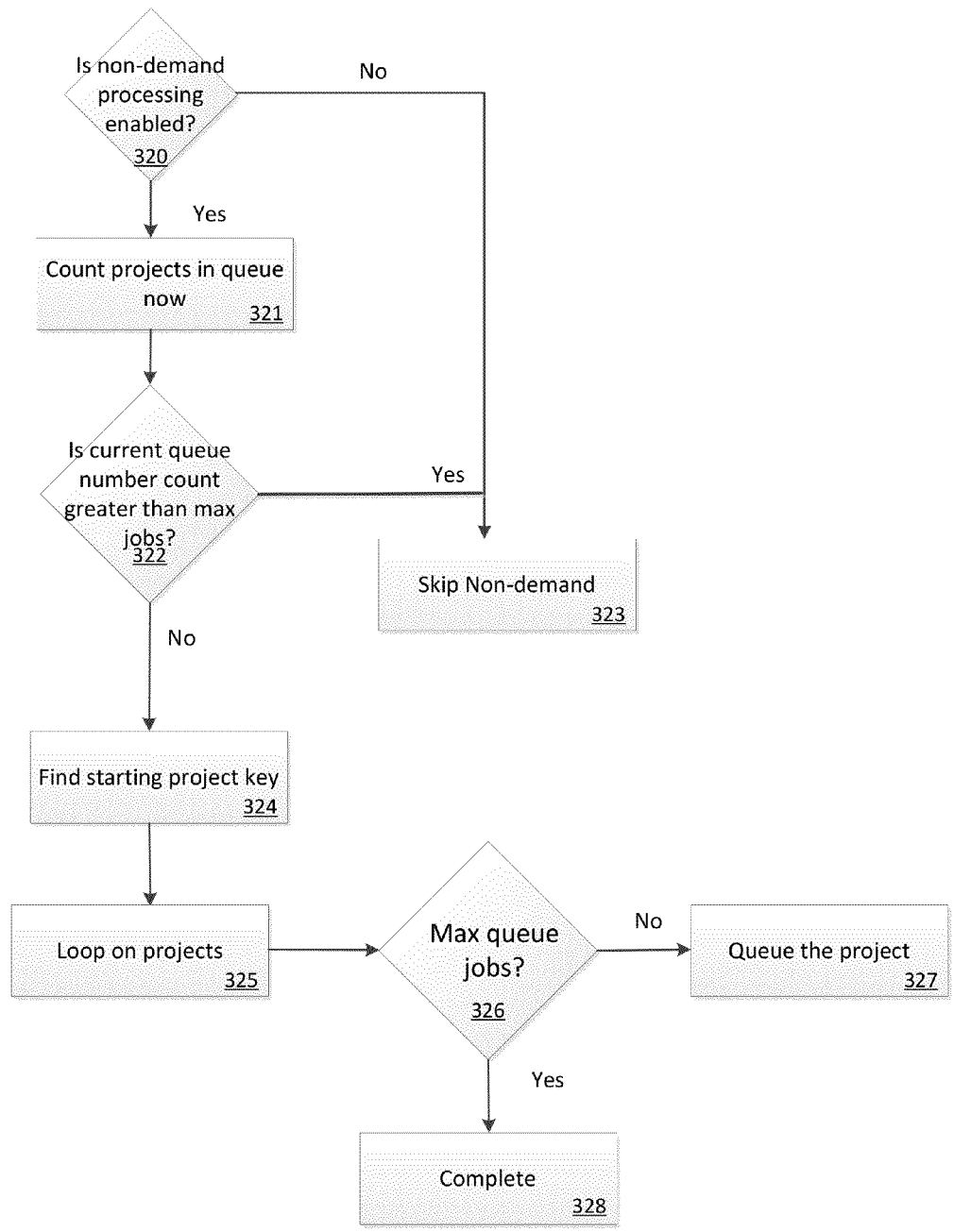
FIG. 3C is a flow diagram of the non-demand project queue flow of FIG. 3A in accordance with one embodiment.

FIG. 3C is a flow diagram of non-demand project queue flow 302 of FIG. 3A in accordance with one embodiment. At 320, a determination is made regarding whether non-demand processing is enabled. If non-demand processing is not enabled, then the non-demand project is skipped over at 323 and is not queued for processing. On the other hand, if non-demand processing is enabled, then a number of projects currently in queue is determined at 321.

At 322, a determination is made regarding whether a current queue number count is greater than a maximum threshold. The current queue number count may correspond to a number of non-demand projects that are queued to be processed. If the current queue number count is greater than the maximum threshold, then the non-demand project is skipped over at 323 and is not queued for processing. The maximum threshold may be 100 non-demand projects, for example.

On the other hand, if the current queue number count is not greater than a maximum threshold, the computer system may determine a project for which to start processing based upon an associated key of the project. For instance, one embodiment may process non-demand projects in an order of ascending key value (i.e., processing non-demand projects from older to newer).

At 325, looping is performed on the projects. Specifically, the system begins at a project with a starting key value greater than the last value processed in the previous run and loops over the projects to iterate over the projects in accordance with ascending key values. The looping serves to queue additional non-demand projects until the maximum threshold of jobs has been reached.

At 326, a determination is made regarding whether the maximum threshold of queued jobs (as described by 322) has been reached. If the queue maximum has not been reached, the non-demand project is queued for processing at 327. On the other hand, if the queue maximum has been reached, the process is completed and ends at 328, and the non-demand project is not queued for processing.

Figure 3D:
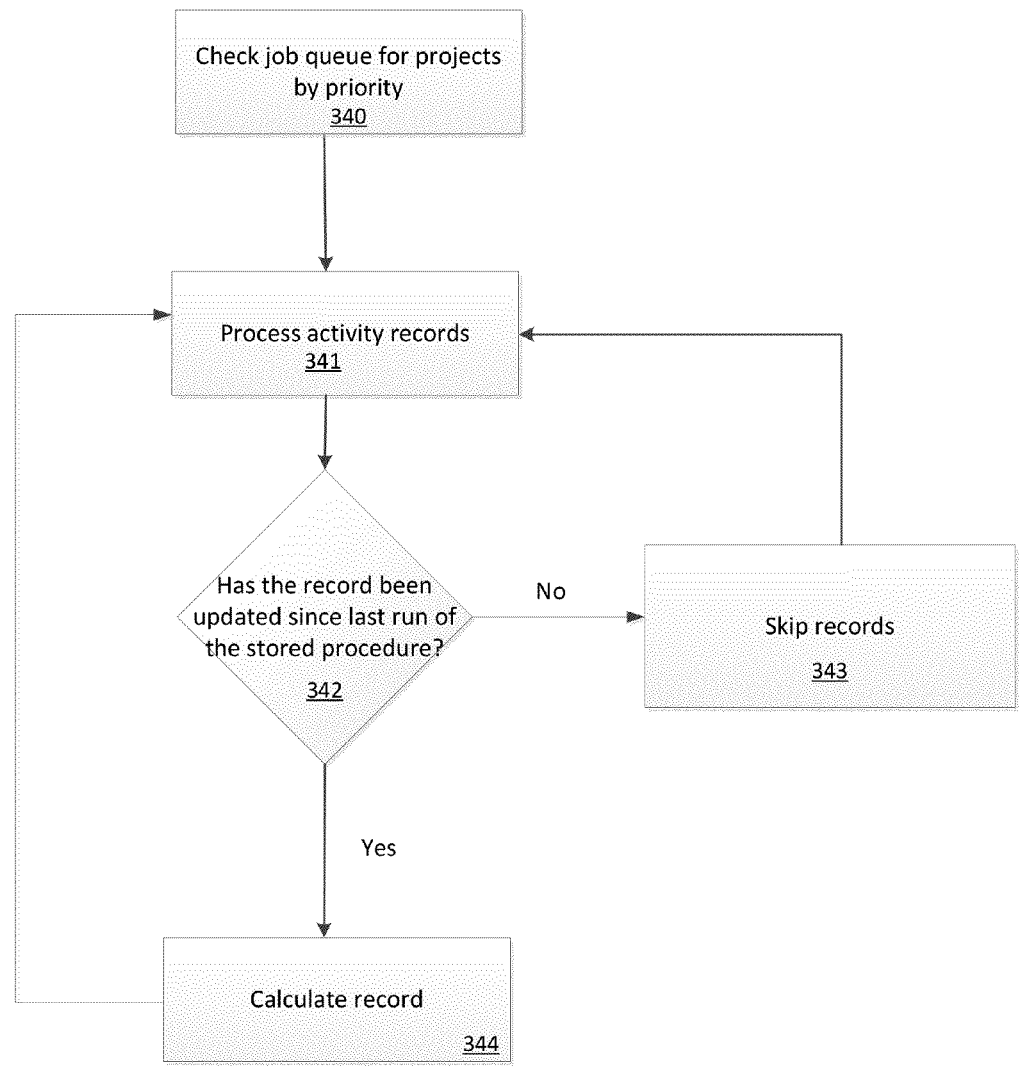
FIG. 3D is a flow diagram of the calculation flow of FIG. 3A in accordance with one embodiment.

FIG. 3D is a flow diagram of calculation flow 303 of FIG. 3A in accordance with one embodiment.

At 340, a checking of a job queue for calculation records by priority is performed. In one embodiment, the job queue is a single queue for both demand and non-demand projects. A priority is determined for each of the projects, and the queued projects are processed by priority.

At 341, activity records are processed to determine whether any updating activity has been performed on the queued projects.

At 342, a determination is made regarding whether a record has been updated since the last run of the stored procedure. If the record has not been updated since the last run of the stored procedure, then the record is skipped at 343. On the other hand, if the record has been updated since the last run, the record is calculated at 344, and the process proceeds to 341. As such, a determination is made regarding whether changes have occurred in data of a base table which would then require corresponding updates of data of an extended table associated with the base table.

Figure 4:
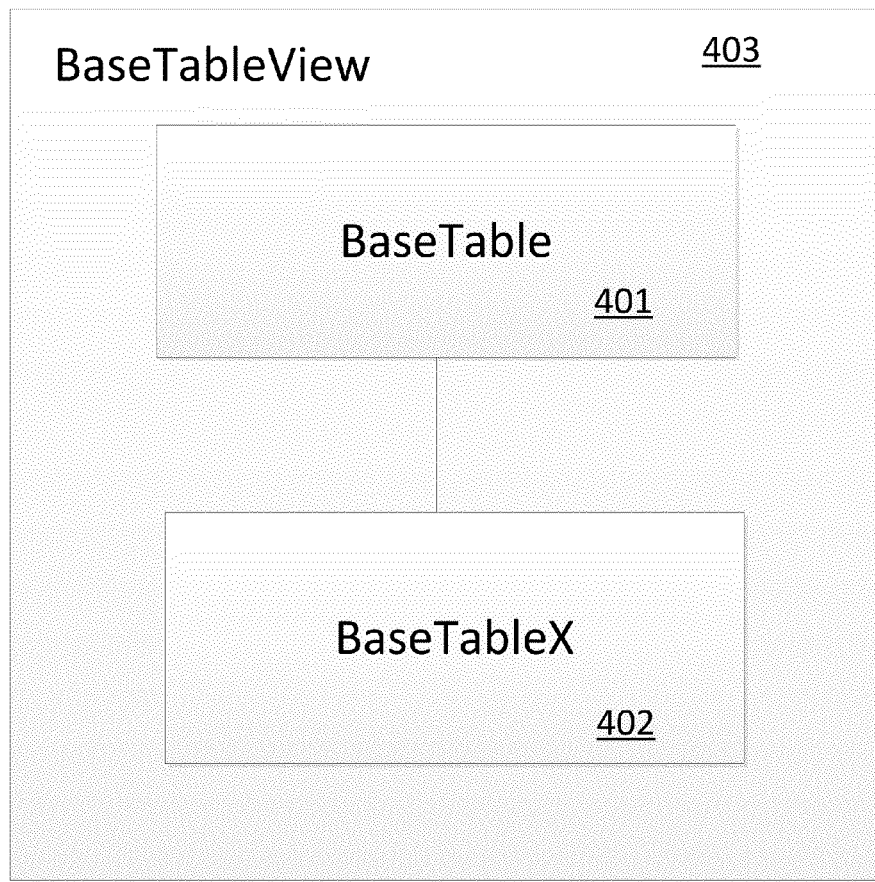
FIG. 4 is a block diagram illustrating providing a combined view to the user in accordance with one embodiment.

FIG. 4 is a block diagram illustrating providing a combined view to the user in accordance with one embodiment. When using the data for operational reporting, for ETL extraction, or for other downstream purposes, the data does not need to be viewed as being bifurcated between base tables and extended tables. Instead, the base tables 401 and extended tables 402 may be combined in a composite view 403 that joins them based on a primary key. The composite view 403 may seamlessly join the data of the base tables and the data of the extended tables. The primary key may be a shared primary key, for example. This composite view provides the user a single database object to access all the data elements.

Figure 5:
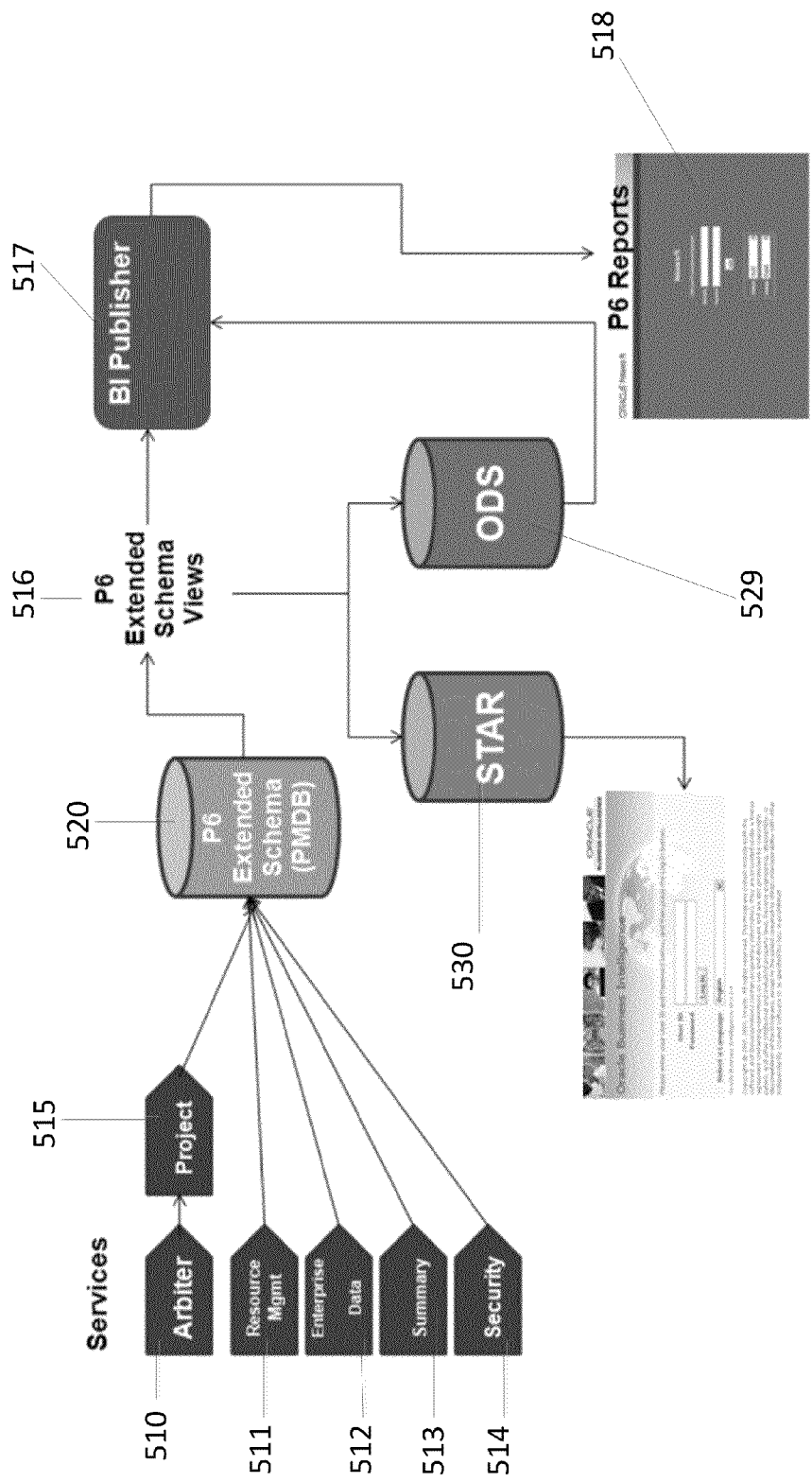
FIG. 5 is a block diagram illustrating a configuration using extended tables with base tables in a project management system in accordance with one embodiment.

FIG. 5 is a block diagram illustrating a configuration using extended tables with base tables in a project management system in accordance with one embodiment. Extended schema 520 is a combination of base tables and extended tables, as illustrated by FIG. 2. In addition to including extended tables within extended schema 520, certain embodiments allow for new logical views 516 based upon data contained within the extended tables of extended schema 520. These new logical views 516 may be further processed by a Business Intelligence ("BI") Publisher 517 before being presented as Report 518 to the user. In certain embodiments, the configuration includes Operational Data Store 529 ("ODS") and/or a database with a star schema 530.

As described above, an arbiter stored procedure 510 may orchestrate, prioritize, and schedule logical units 515 (e.g. projects) to be processed based on user-maintained thresholds. Certain embodiments may also have additional services for updating data within the extended tables of extended schema 520. For example, additional services may include publish enterprise data 512, publish enterprise summaries 513, publish resource management 511, and publish security 514.

Each of these services can recalculate data and store the recalculated data within the extended tables of extended schema 520. Publish enterprise data service 512 calculates and updates enterprise-level business objects containing calculated and denormalized fields, including but not limited to cost accounts, currencies, calendars, codes, funding sources, resource teams, role teams, and timesheet dates. Publish enterprise summaries service 513 calculates and updates enterprise project structure-level ("EPS") spread data for currently updated projects in a given EPS. Publish resource management service 511 calculates and updates the resource hierarchy, resources, resource rates, resource limits, role rates, resource role assignments, and resource security. Publish security service 514 updates users, security profiles, and calculates security for extended schema 520.

As described above, certain embodiments are directed to a project management system that provides a user with near or substantially real-time reporting of project management data. The system may define extended tables associated with corresponding base tables. The system may also perform asynchronous updating for project management reporting on data contained within the extended tables. The system may also provide users with a composite view of the data contained by the extended tables and of the data contained by the base tables.

Certain embodiments allow for the seamless maintenance of complex calculations in an efficient manner. These embodiments reduce the overall footprint and resource usage of a computer system because data value calculation (which may be data and CPU intensive) may be deferred until a time when the calculations can be performed more efficiently. Certain embodiments allow for active operational reporting and integration with the system without changing the user experience when maintaining the data.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to perform asynchronous updating for project management reporting, the asynchronous updating comprising:

defining a plurality of extended tables, wherein each extended table of the plurality of extended tables is associated with a corresponding base table of a plurality of base tables;

updating data contained by the plurality of extended tables in accordance with data contained by the plurality of base tables, wherein the updating is performed asynchronously across logical units of data contained by the plurality of extended tables, wherein the logical units of data include demand projects and non-demand projects, wherein a precedence of the updating is based on whether each logical unit is a demand project or a non-demand project, wherein the demand projects are queued for the updating based on a first queue flow and the non-demand projects are queued for the updating based on a second queue flow, wherein the first queue flow and the second queue flow are processed according to distinct algorithms, wherein the updating is performed upon a completion of the first queue flow or the second queue flow, wherein the updating is performed after a first threshold or a second threshold is met, the first threshold being based upon changes in the data contained by the plurality of base tables, and the second threshold being based upon an amount of time that has passed since a last update that has resulted in at least one change in the data contained by the plurality of extended tables; and providing a combined view of the data contained by the plurality of extended tables and the data contained by the plurality of base tables.

2. The computer readable medium of claim 1, wherein the data contained by the plurality of extended tables comprises calculated attributes derived from the data contained by the plurality of base tables.

3. The computer readable medium of claim 1, wherein each extended table and each corresponding base table share a same primary key.

4. The computer readable medium of claim 1, wherein the updating further comprises:

organizing the data contained by the plurality of extended tables by determining a priority for each of the demand projects and the non-demand projects; and updating the data contained by the plurality of extended tables according to the priority.

5. The computer readable medium of claim 1, wherein the providing comprises providing a single database object to access the data contained by the plurality of extended tables and the data contained by the plurality of base tables.

6. A method for performing asynchronous updating for project management reporting, the method comprising:

defining a plurality of extended tables, wherein each extended table of the plurality of extended tables is associated with a corresponding base table of a plurality of base tables;

updating data contained by the plurality of extended tables in accordance with data contained by the plurality of base tables, wherein the updating is performed asynchronously across logical units of data contained by the plurality of extended tables, wherein the logical units of data include demand projects and non-demand projects, wherein a precedence of the updating is based on whether each logical unit is a demand project or a non-demand project, wherein the demand projects are queued for the updating based on a first queue flow and the non-demand projects are queued for the updating based on a second queue flow, wherein the first queue flow and the second queue flow are processed according to distinct algorithms, wherein the updating is performed upon a completion of the first queue flow or the second queue flow, wherein the updating is performed after a first threshold or a second threshold is met, the first threshold being based upon changes in the data contained by the plurality of base tables, and the second threshold being based upon an amount of time that has passed since a last update that has resulted in at least one change in the data contained by the plurality of extended tables; and providing a combined view of the data contained by the plurality of extended tables and the data contained by the plurality of base tables.

7. The method of claim 6, wherein the data contained by the plurality of extended tables comprises calculated attributes derived from the data contained by the plurality of base tables.

8. The method of claim 6, wherein each extended table and each corresponding base table share a same primary key.

9. The method of claim 6, further comprising:

organizing the data contained by the plurality of extended tables by determining a priority for each of the demand projects and the non-demand projects; and updating the data contained by the plurality of extended tables according to the priority.

10. The method of claim 6, wherein the providing comprises providing a single database object to access the data contained by the plurality of extended tables and the data contained by the plurality of base tables.

11. A system for performing asynchronous updating for project management reporting, the system comprising:

a processor;

a memory coupled to the processor;

an extended table defining module that defines a plurality of extended tables, wherein each extended table of the plurality of extended tables is associated with a corresponding base table of a plurality of base tables;

a data updating module that updates data contained by the plurality of extended tables in accordance with data contained by the plurality of base tables, wherein the updating is performed asynchronously across logical units of data contained by the plurality of extended tables, wherein the logical units of data include demand projects and non-demand projects, wherein a precedence of the updating is based on whether each logical unit is a demand project or a non-demand project, wherein the demand projects are queued for the updating based on a first queue flow and the non-demand projects are queued for the updating based on a second queue flow, wherein the first queue flow and the second queue flow are processed according to distinct algorithms, wherein the updating is performed upon a completion of the first queue flow or the second queue flow, wherein the updating is performed after a first threshold or a second threshold is met, the first threshold being based upon changes in the data contained by the plurality of base tables, and the second threshold being based upon an amount of time that has passed since a last update that has resulted in at least one change in the data contained by the plurality of extended tables; and a viewing module that provides a combined view of the data contained by the plurality of extended tables and the data contained by the plurality of base tables.

12. The system of claim 11, wherein the data contained by the plurality of extended tables comprises calculated attributes derived from the data contained by the plurality of base tables.

13. The system of claim 11, wherein each extended table and each corresponding base table share a same primary key.

14. The system of claim 11, further comprising:

an organizing module that organizes the data contained by the plurality of extended tables by determining a priority for each of the demand projects and the non-demand projects, wherein the data updating module updates the data contained by the plurality of extended tables according to the priority.

15. The system of claim 11, wherein the viewing module provides a single database object to access the data contained by the plurality of extended tables and the data contained by the plurality of base tables.

* * * * *